United States Patent [19]

Schmidt

[11] 4,164,741
[45] Aug. 14, 1979

[54] DECEPTION CIRCUITRY FOR AUTOMATIC RANGE GATE TRACKING IN FIRE CONTROL RADAR

[75] Inventor: Jerry D. Schmidt, Enon, Ohio

[73] Assignee: The United States of America as represented by the Secretary of the Air Force, Washington, D.C.

[21] Appl. No.: 761,891

[22] Filed: Sep. 13, 1968

[51] Int. Cl.$^2$ .............................................. G01S 7/38
[52] U.S. Cl. .................................................. 343/18 E
[58] Field of Search ........................ 343/18 E; 328/58

[56] References Cited

U.S. PATENT DOCUMENTS 2,931,031  3/1960  Deloraine et al. ................. 343/18 E
2,943,318  6/1960  Deloraine et al. ................. 343/18 E
2,989,744  6/1961  Pettit ................................. 343/18 E
3,007,159  10/1961 Podington .......................... 343/18 E
3,068,417  12/1962 Fiske .................................. 328/58 X
3,971,021  7/1976  Cann .................................. 343/18 E
4,072,949  2/1978  Van Brunt ......................... 343/18 E Primary Examiner—T. H. Tubbesing
Attorney, Agent, or Firm—Joseph E. Rusz; Robert Kern Duncan

[57] ABSTRACT

An acoustic delay line is used in a feed-back loop in the traveling wave tube repeater chain of an electronic countermeasures system to provide a wider transmitted pulse (than the pulse received by the ECM system) resulting in range gate deception in an opposing tracking radar.

4 Claims, 3 Drawing Figures

DECEPTION CIRCUITRY FOR AUTOMATIC RANGE GATE TRACKING IN FIRE CONTROL RADAR

BACKGROUND OF THE INVENTION

The field of this invention is in the electronic countermeasures art.

The desirability of adding range gate deception to an ECM system is well understood and particularly the desirability of range gate deception means that will not require shutting off the receiver of the system with the resulting dead time in the repeater capability. Prior to this invention this has been only partially accomplished and then only in a limited and essentially impractical way. The prior art repeaters with range gate deception have attempted to achieve a broadened pulse by using a coaxial line delay means. The operating systems have had coaxial delay lines approximately 130 feet long and these lines provided a delay of only 0.15 microsecond. These systems required that the receiver be shut off after the 0.15 microsecond of delay to prevent interference when the wave is reinforced. Making the coaxial line longer to provide greater delay has been prohibitive because of line loss. Using the 0.15 microsecond delay causes the repeated radio frequency signal to be spread and cover a spectrum of approximately 6.7 megacycles of RF frequencies. This is wider than the (opposing) radar receiver bandwidth and, as a result, much of the jammer energy is not effective. The requirement of having to shut off the receiver after the 0.15 microsecond additionally causes the jammer to not repeat a pulse that is delayed with respect to the first pulse by 0.15 microsecond or more.

To further explain by example this deficiency of prior systems using a coaxial line delay means; assume a system has a delay of 0.15 microsecond in the coaxial line in the feedback loop to widen a received radar pulse; the typical received pulse has a width of 0.5 microsecond, then the delayed pulse will be fed back into the system while the received pulse is still coming in. Thus, the received energy must be shut off to the repeater system after 0.15 microsecond (to prevent interference and cancellation) to allow the feed-back loop to ring providing a pulse (by the successive ringing) that is wider than the original received pulse signal.

SUMMARY OF THE INVENTION

An electronic countermeasures system is disclosed that provides a wider return pulse which causes range gate deception in a tracking radar system. The invention resides in a feed-back loop having an acoustic delay coupling back into the input of a traveling wave tube repeater chain a delayed portion of the signal from a higher level point of the chain. The delayed signal traverses the chain and emerges from the chain essentially as a continuation of the original pulse. Due to the feed-back this repeating continues in a ringing manner further extending the time width of the transmitted signal. An acoustic delay line will provide a delay essentially equal to the normal radar pulse length (width), thus the reception of signals does not have to be shut off while pulse stretching is occurring. The signal characteristics of a system using acoustic delay lines are such that the transmitted signal is not spread spectrum wise. This makes a greater amount of repeater energy available to deceive the opposing radar receiver. Various amounts of delay are readily obtainable in acoustic delay lines so that delays equivalent to pulse length are readily available.

BRIEF DESCRIPTION OF THE DRAWINGS

FIG. 3 is a complete block diagram of an ECM system (less the antenna systems) incorporating the invention.

DESCRIPTION OF THE PREFERRED EMBODIMENTS

Figure 1:
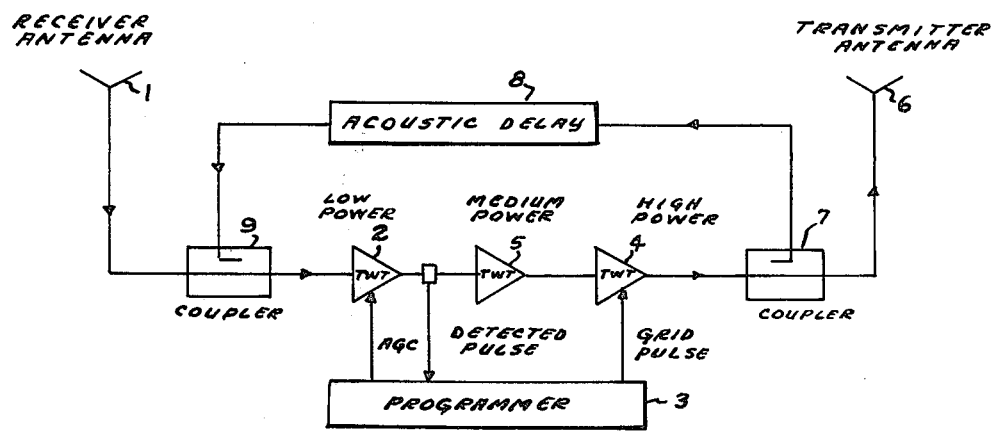
FIG. 1 is a simplified block diagram of an embodiment of the invention wherein the feed-back delay loop encompasses the complete traveling wave tube chain.

FIG. 1 shows, in a block diagram form, the incorporation of this invention in a straight-thru electronic countermeasures repeater system. A pulse from an opposing (enemy) range tracking radar is received in the receiver antenna 1 and amplified by the low power TWT (traveling wave tube) amplifier 2. The pulse is detected and sent to the programmer 3. If the programmer cycle is such as to command the repeater to repeat the pulse the high power pulsed TWT amplifier 4 is turned on. The pulse meanwhile passes on through the medium power TWT amplifier 5 and is applied to the high power pulsed TWT amplifier 4. Assuming that the high power amplifier is on, the pulse is amplified and transmitted by antenna 6. A portion of the signal energy from the high power TWT amplifier 4 is coupled off by the coupler 7 and passed through the acoustic delay device 8 and coupled back into the receiver line through the coupler 9. The pulse is recirculated in this manner (rings) through the cascaded traveling wave tube signal amplifiers until the energy in the power supply of the pulse TWT 4 is dissipated. It is desirable that the delay in the feedback loop be approximately equal to the received pulse width. Five hundred nanoseconds of delay time been found to be an optimum value to match most opposing radar systems.

In some instances it has been found, because of the noise of the final TWT, that it was not desirable to include the final TWT in the feed-back loop. An embodiment of this invention in which the final TWT is not included in the feed-back loop is shown in simplified block form in FIG. 2. Since the gain afforded by the final TWT 21 is not available in this embodiment to overcome the loss in the acoustic delay line 22 as it is in the embodiment of FIG. 1, it is desirable to include another low noise TWT 23 in the feed-back loop. This embodiment shown in FIG. 2 also has a conventional PIN (a p-type, an intrinsic [equally populated by n- and p-type carriers] and an n-type layer semiconductor) "dump" switch 24 in the feed-back loop controlled by the programmer so that the loop may be effectively disconnected and the ringing (repeating of the pulse) stopped after a programmed number of rings. This determines the extent to which the transmitted pulse is widened compared to the received pulse. Two rings widen a 0.5 microsecond pulse to 1.5 microseconds, three rings widen it to 2.0 microseconds. Generally two or three rings widen the pulse a sufficient amount to cause the opposing tracking radar range gate to move to the center of the expanded pulse thus moving the opposing range gate off the target and producing an effective infinite jam-to-signal ratio.

The desirability of keeping the delay time approximately equal to the time width of the received signal may be further understood when it is considered that some cancellation may occur when the incoming wave and the delayed wave are added. This may tend to produce a dip in the transmitted energy which the opposing radar receiver would indicate, alerting the operator. Small amounts of overlap are insignificant, for example, if a 0.5 microsecond pulse is overlapped 0.1 microsecond the radar receive bandwidth would have to be 10 megacycles to "see" the dip in the pulse—normally radar receivers do not have this much bandwidth.

Figure 2:
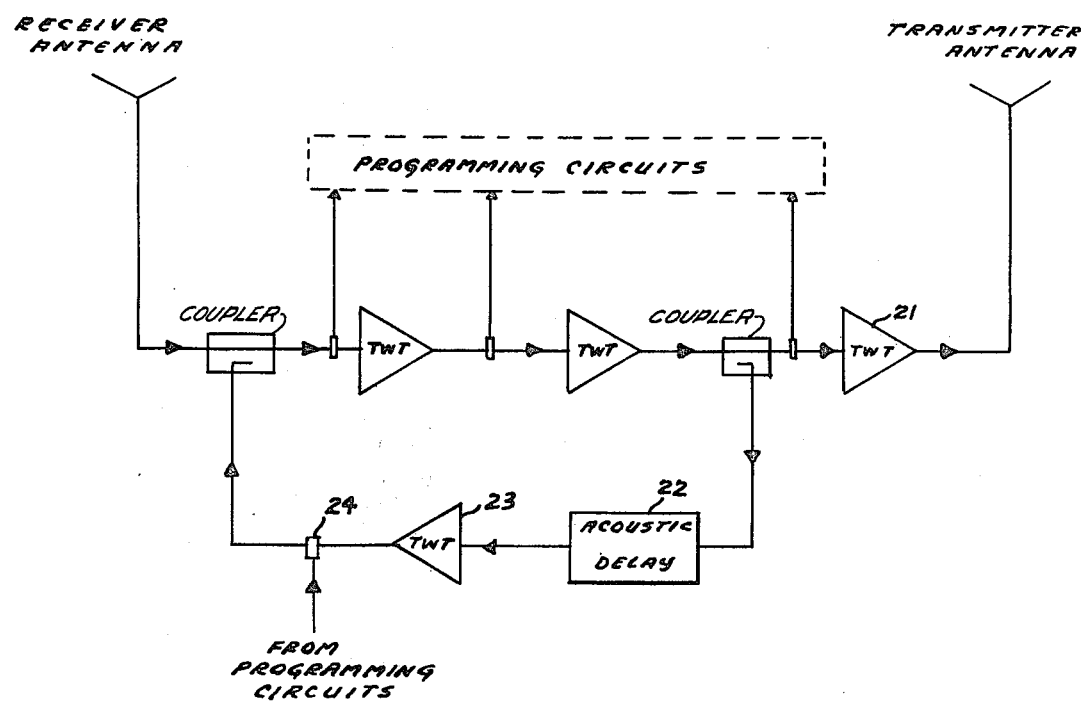
FIG. 2 is a simplified block diagram of an embodiment of the invention wherein the feed-back delay loop encompasses only the lower level portions of the traveling wave tube chain.
Figure 2:
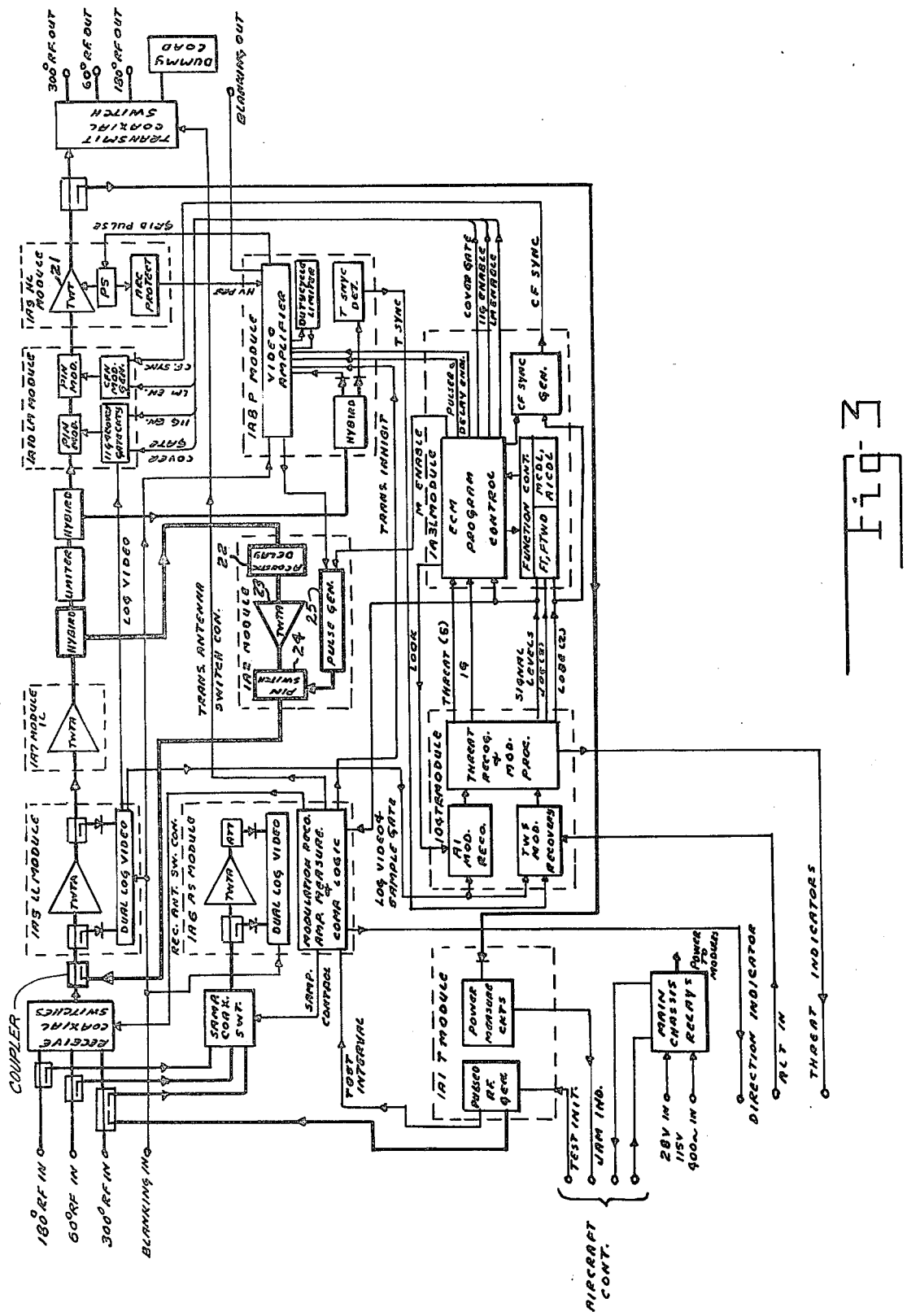

FIG. 3 is a detailed block diagram of the embodiment of this invention as shown in simplified form in FIG. 2. This embodiment has proven very effective in providing a return pulse that is deceptive to opposing tracking radars. The apparatus in heavy outline is the improvement constituting the invention. It is shown incorporated in a typical ECM repeater chain. The pulse generator 25 shown in this embodiment is a conventional OR type gate circuit generating a pulse responsive to either of the existing pulse signals from the ECM program control or video amplifier of the overall programming apparatus. In this embodiment when used primarily against tracking radars having a pulse with of approximately 0.5 microsecond, a commercially available two port crystal delay line weighing only eight ounces and having; a delay of 500 nanoseconds ±50 nanoseconds in the frequency band of operation (typically 9.1 GHz to 9.6 GHz), a normal pulse power rating of at least ±30 dbm, a maximum VSWR of not greater than 5:1 within the band, and a maximum insertion loss of 85 db within the band, has been found to be very satisfactory. This particular unit has a length of approximately four inches and a cross-sectional area of approximately one and one-half square inchs.

It is to be understood that the structure of the acoustic delay line is not a part of this invention nor is the programmer and its associated circuitry which controls the traveling wave tube repeater chain deciding which signals to repeat, how long to stretch the repeated pulse (number of rings permitted) and the other numerous parameters controlled by the programmer.

I claim:

1. The improvement in a traveling wave tube repeater chain of an ECM system for receiving a radar pulse of essentially predetermined time width from an opposing range gate tracking radar and providing a deceptive transmitted signal, the traveling wave tube repeater chain having a low power level traveling wave tube amplifier and a higher power level traveling wave tube amplifier, the said improvement comprising:
   (a) feedback means cooperating with the higher power traveling wave tube amplifier and the low power traveling wave tube amplifier for feeding back a portion of the output signal of the higher power traveling wave tube amplifier to the low power traveling wave tube amplifier; and
   (b) acoustic delay means cooperating with the said feed-back means for delaying the feed-back signal.

2. The improvement as claimed in claim 1 wherein the said acoustic delay means has a delay time approximately equal to the said predetermined time width of the opposing radar.

3. The improvement in a traveling wave tube repeater chain of an ECM system for receiving a radar pulse of essentially predetermined time width from an opposing range gate tracking radar system and providing a deceptive transmitted signal, the traveling wave tube repeater chain having a cascade for signal amplification a low power traveling wave tube amplifier, an intermediate traveling wave tube amplifier; and a high power traveling wave tube amplifier; and the said ECM system having programming means for controlling the said repeater chain, the said improvement comprising:
   (a) a first coupling means interposed the intermediate traveling wave tube amplifier and the high power traveling wave tube amplifier for coupling off a portion of the amplified signal;
   (b) acoustic delay means cooperating with the first coupling means for delaying the portion of the signal coupled off;
   (c) traveling wave tube amplifying means cooperating with the said acoustic delay means for amplifying the delayed signal;
   (d) a second coupling means cooperating with the said low power traveling wave tube amplifier for feeding back the delayed signal into the low power traveling wave tube amplifier; and
   (e) means including a PIN dump switch responsive to the said programming means, cooperating with the said taveling wave tube amplifying means, and the said second coupling means for disconnecting the said signal being fed back into the low power traveling wave tube amplifier.

4. The improvement as claimed in claim 3 wherein the said acoustic delay means provides a delay approximately equal to the said predetermined time width of the pulse of the opposing radar.

* * * * *